Feb. 21, 1933.  A. BRANDRIFF  1,898,935
PIPE CUTTER AND VALVE INSERTING MACHINE
Filed March 3, 1928  3 Sheets-Sheet 1
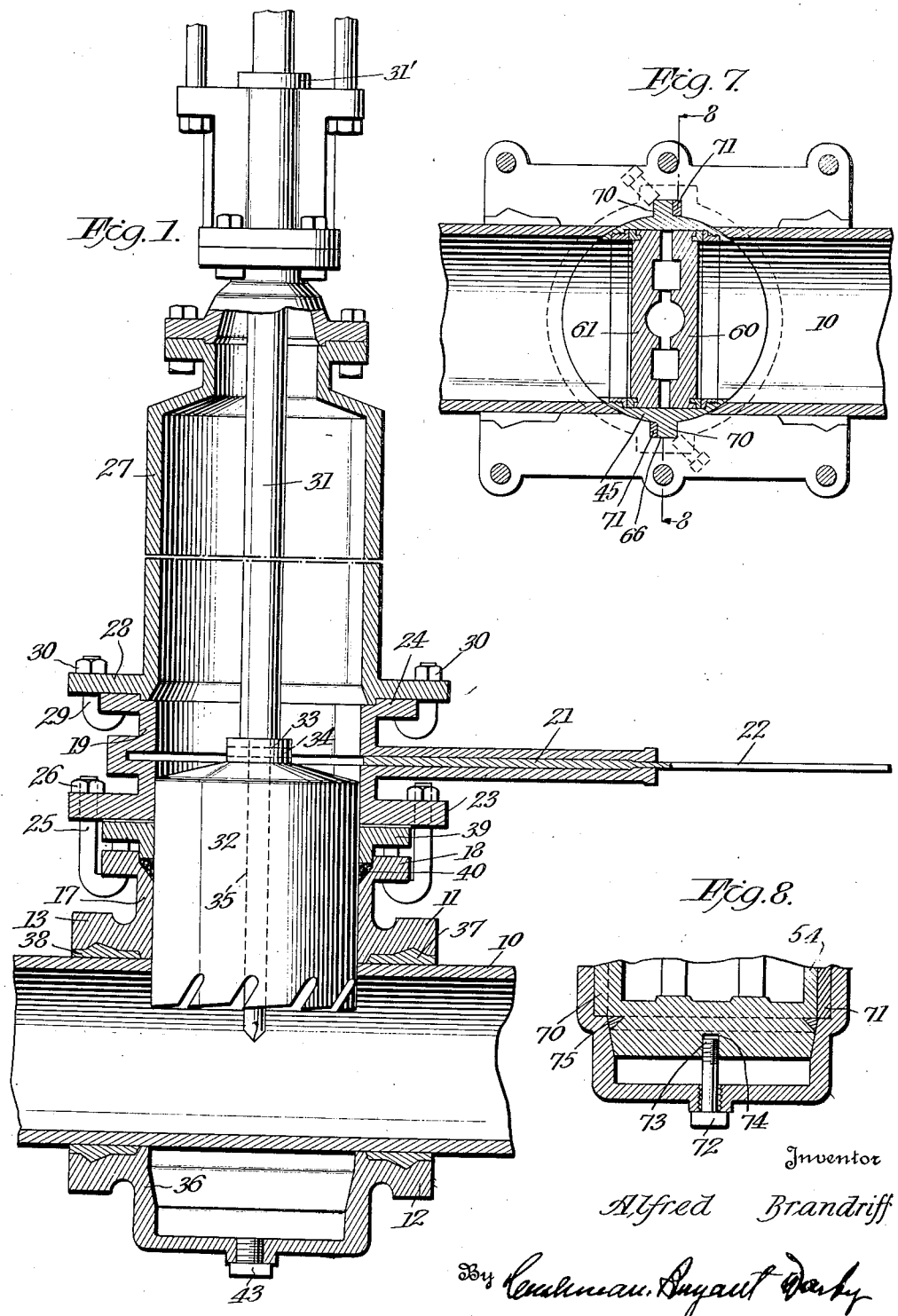

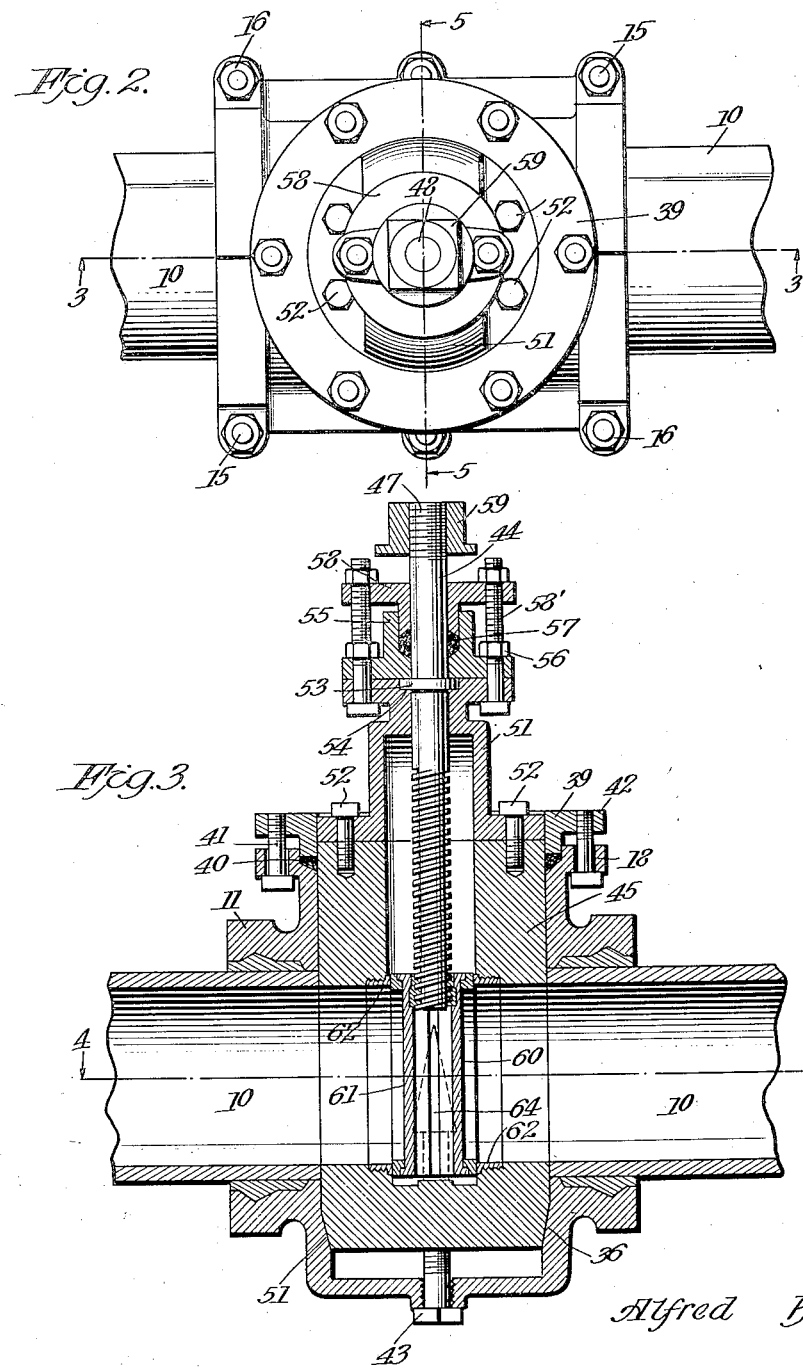

Feb. 21, 1933.            A. BRANDRIFF            1,898,935
PIPE CUTTER AND VALVE INSERTING MACHINE
Filed March 3, 1928      3 Sheets-Sheet 3
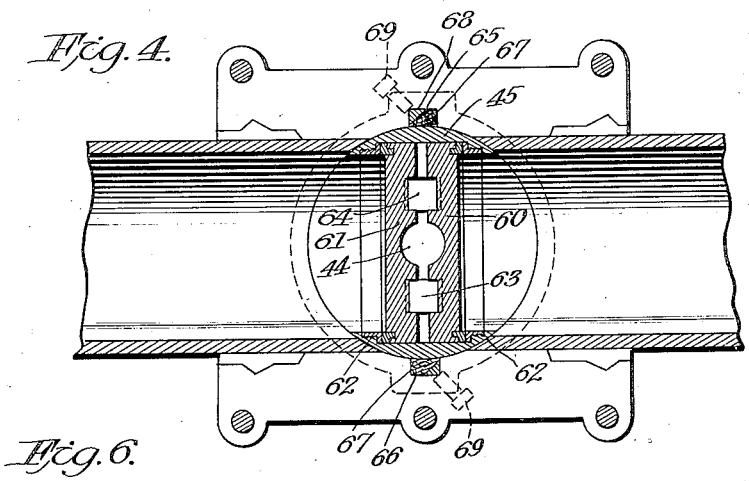
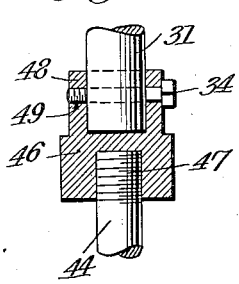
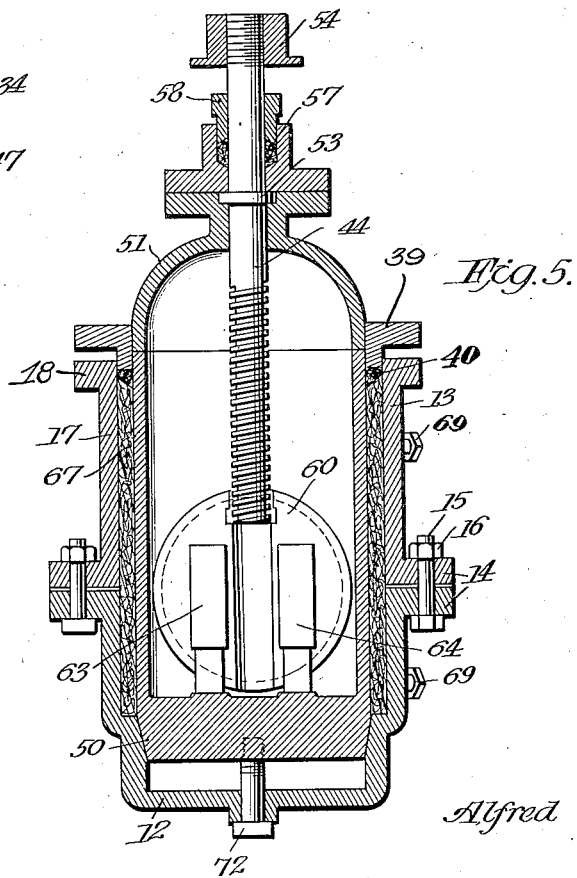
Inventor
Alfred Brandriff
By Cushman, Bryant & Darby
Attorneys Patented Feb. 21, 1933

1,898,935

UNITED STATES PATENT OFFICE

ALFRED BRANDRIFF, OF MILLVILLE, NEW JERSEY, ASSIGNOR TO MUELLER CO., OF DECATUR, ILLINOIS, A CORPORATION OF ILLINOIS

PIPE CUTTER AND VALVE INSERTING MACHINE

Application filed March 3, 1928. Serial No. 258,958.

The present invention relates to valves and more particularly to improved means for inserting a valve unit under pressure in a supply main or the like.

A primary object of the invention is to provide means for severing a section of a main or supply pipe and inserting therein a separate valve casing unit without the necessity of cutting off the supply.

A further object of the invention consists in permanently connecting to a main, a valve casing and detachably associating with the valve casing a mechanism for severing a portion of the main and inserting therein a valve unit with a minimum interruption of the flow through the main.

Another object consists in providing a shell cutter for severing the main which is of larger diameter than the diameter of the main so as to permit the ready removal of the cut out portion and the insertion of a valve unit.

A still further object comprehends the provision of means associated with the valve casing for guiding the valve unit into proper position, which means may coact with a packing for insuring a tight joint between the valve unit and the casing.

Other objects and advantages of the invention will become apparent from the following description when taken in conjunction with the accompanying claims.

Referring to the drawings in which are disclosed several preferred embodiments of the invention:

Figure 1 is a vertical sectional view of the main and valve casing showing a portion of the cutting mechanism associated therewith.

Figure 2 is a plan view of the main and valve casing with the valve unit connected thereto.

Figure 3 is a sectional view taken substantially along the line 3—3 of Figure 2.

Figure 4 is a sectional view taken substantially along the line 4—4 of Figure 3.

Figure 5 is a sectional view taken substantially along the line 5—5 of Figure 2.

Figure 6 is a sectional detail view of the connecting means for securing the valve unit to the actuating spindle.

Figure 7 is a sectional view similar to Figure 4 showing a modified form of construction.

Figure 8 is a sectional view taken substantially along the line 8—8 of Figure 7.

Referring to the drawings in which like numerals indicate like parts in the various views, and more particularly Figure 1, 10 denotes a supply pipe or main through which any suitable fluid may flow, such as water, gas, air, steam or the like, and to which it is desired to connect permanently a valve unit without the necessity of shutting off the pressure of the main supply. In order to accomplish this, a sectional valve casing 11 is clamped thereon at the point where the valve unit is desired to be inserted. The casing 11 is preferably composed of a lower section 12 and an upper section 13, each of which is provided with opposed horizontal flanges 14 (Figure 5) that encircle the main 10, and are clamped together by the bolts 15 and the nuts 16. The upper section 13 of the casing preferably has a tubular extension 17 which terminates in an annular flange 18 and is disposed substantially at right angles to the main 10.

In order to permit the cutting mechanism and valve unit to be inserted in the casing without the necessity of cutting off the main supply or allowing any of the fluid to escape, there is temporarily connected to the valve casing 11 an auxiliary valve casing or section 19 which is provided with a sliding valve 21 having a handle 22 for moving the valve into and out of closed position. The opposed ends of the auxiliary valve casing 19 preferably have the annular flanges 23 and 24 respectively, the lower flange 23 of which is provided with a series of openings through which extend the hook bolts 25 that engage at their lower ends the flanges 18 of the valve casing 11 and have their opposite extremities threaded for the reception of the nuts 26 so as to detachably connect the auxiliary valve casing 19 to the valve casing 11. A suitable mechanism for carrying a cutting tool and inserting the valve unit in position may be detachably connected to the auxiliary valve casing 19 and in the present instance the lower portion of this mechanism is shown as a drilling machine in which the housing 27 is provided with an annular flange 28 through which extends the hook bolts 29 that engage the flange 24 of the auxiliary valve section 19 and are detachably connected thereto by the nuts 30.

The lower portion of a spindle or boring bar 31 extends axially through the housing 27 and is connected at its upper end to any suitable actuating means, not shown, while its opposite end is arranged to receive a shell cutter 32 that has a reduced annular collar 33 to which the spindle 31 is detachably connected by a transverse pin or bolt 34.

A pilot drill 35 is also connected to the spindle 31 by the pin 34 and extends axially from the spindle to a point beyond the end of the shell cutter 32. The lower section 12 of the casing 10 has preferably formed in the bottom thereof a tapered seat 36 that receives the complementary formed portion of a valve unit which will subsequently be described.

The ends of the casing 11 through which the main 10 extends are preferably calked as at 37 and 38 with lead so as to insure a tight connection when the sections of the casing are bolted to the main.

Preferably positioned between the tubular extension 17 and the auxiliary valve casing 19 is a gland 39 which during the cutting operation loosely maintains a packing 40 in position, but when the valve unit is inserted is brought into tight engagement with the packing by means of the screws 41 (Figure 3) which extend through suitable openings in the flange 18 of the valve casing and a complementary disposed flange 42 in the gland 39. The lower section 12 of the casing 11 is preferably provided with a centrally disposed threaded opening through which extends a bolt 43, the purpose of which will be later described.

A packing 31' (Figure 1) surrounds the solid spindle 31 preferably above the housing 27 so as to prevent the escape of fluid when the pipe is being severed. As shown in Figure 1, the auxiliary sliding valve 21 has been moved to its open position so as to permit the insertion of the shell cutter 32 and its associated parts into the casing 11, while the cutter and drill 35 are in the position they assume after entering the main 10. After the cutter has completely severed the main, it is withdrawn therefrom by the actuation of the spindle 31 which likewise removes the pilot drill 35 and the cut-out portion of the main. Upon the cut-out portion passing the auxiliary sliding valve 21, the valve 21 is moved to its closed position to prevent the escape of fluid from the main. The housing 27 is then disengaged from the auxiliary valve casing 19 and the shell cutter and its associated parts removed from the spindle 31. The stem 44 of the cylindrical valve unit 45 is then connected to the lower portion of the spindle 31 in any suitable manner such as by the coupling 46 (Figure 6). The coupling 46 preferably has an interiorly threaded recess in its lower end which receives the threaded portion 47 of the valve stem 44 while its opposite end is provided with a reduced tubular sleeve 48 arranged to receive the adjacent end of the spindle 31 which is detachably connected thereto by means of the bolt 34 that extends through a transverse opening in the spindle and aligned openings 49 in the sleeve 48.

The housing 27 is then clamped on the auxiliary valve section 19 by the bolts 29, and upon the sliding valve 21 being moved to its open position, the spindle 31 is actuated until the tapered lowered end 50 of the cylindrical valve unit 45 is moved into engagement with the seat 36 in the section 12 of the valve casing. It will be seen that the valve seat 36 coacts with the lower tapered portion 50 of the valve unit so as to insure the proper registration of the openings in the valve unit with the main. The spindle 31 is then retracted and the auxiliary valve section 19 and housing 27 removed from the valve casing. The packing 40 is now brought into tight engagement with the wall of the valve unit by the tightening of the bolts 41 on the gland 39. A bonnet 51 may be attached to the top of the section 11 by the bolts 52. The valve stem 44 extends through the bonnet 51 and has an annular collar 53 that fits in a recess 54 in the bonnet and is held therein by a bushing 55 secured by the bolts 56 to the bonnet. A packing 57 which fits in the bushing surrounds the stem 44 and is held in position by a gland 58 that is adjustably secured to the bushing 55 by the bolts 58'. The threaded portion 47 of the valve stem 44 to which the spindle 31 was previously connected by the coupling 46 may now have connected thereto a nut 59 to which any suitable tool such as a wheel or the like can be attached for actuating the gate valves 60 and 61 that are suitably threaded to the lower portion of the valve stem 44 so as to be moved vertically into and out of closed position with the annular valve seats 62 in the valve unit 45 (Figure 4).

The valve unit 45 may be of any ordinary type with the exception that it should have a cylindrical body so as to fit within the cut out portion of the main and the extension 17 of the valve casing. The gate valves 60 and 61, as shown, are of the usual sliding double disk type and are moved into engagement with their valve seats by the wedges 63 and 64 that are suitably secured to the bottom of the valve unit (Figure 5).

The sections 12 and 13 of the valve casing may be provided with diametrically disposed grooves or slots 65 and 66 (Figure 4) in each of which is inserted a suitable packing 67. A metal liner 68 is arranged at opposite corners of the packing 67 and has engaging therewith a set screw 69 which extends exteriorly of the casing so as to maintain the packing in tight engagement with the adjacent wall of the valve unit 45. Instead of the packing 67, a modified construction, as shown in Figure 7, may be employed in which the valve unit 45 is provided with integral projections or splines 70 which fit in the grooves 66 of the valve casing. A suitable packing 71 fits in the grooves 66 and engages opposite sides of the projection 70 so as to insure a tight joint between the parts. This construction has the dual advantage that it acts to guide the valve unit 45 into proper position for alignment of the openings with the inlet and outlet ports of the casing and also insures a tight joint being formed between the valve unit and the casing.

The bolt 43 (Figure 3) is arranged to force the valve unit 45 from engagement with its seat 36 when it is desired to remove the valve unit in order to inspect or repair the same.

In order to securely maintain the valve unit in its seat 36 when the spindle 31 and its associated parts are being removed, the bolt 43 may be taken out of the opening in the bottom of the section 12 and a screw 72 inserted therefor, which screw is provided with a threaded stem 73 arranged to fit into a complementary formed threaded recess 74 in the valve unit (Figure 8), thus locking the valve unit to the casing. Additionally, a ring 75 of any suitable soft material such as tin or lead may be connected to the lower portion of the valve unit, or in a groove in seat 36 so as to provide an additional sealing means for the fluid.

When inserting the smaller type of valve units in the main, the auxiliary sliding valve casing 21 may be dispensed with and the ordinary gate valve be employed for accomplishing the same purpose.

It will be observed that by reason of the present construction very simple and efficient means are provided for inserting a valve unit in a main. Moreover, the parts may readily be installed and dismantled at a minimum expenditure of time and labor.

It is to be understood that the forms of invention shown and described are merely illustrative of preferred embodiments and that such changes and modifications may be made as fall within the purview of one skilled in the art without departing from the spirit of the invention and the scope of the appended claims.

I claim:

1. In combination with a casing adapted to be clamped to a main, a valve unit insertable in said casing, said casing having opposed vertically disposed grooves coacting with complementary projections on the valve unit for guiding the latter into position, a packing in each of said grooves and engaging said valve unit for providing a tight joint between the parts, and manually operable means extending outwardly from said casing for maintaining the packing in engagement with said valve unit.

2. In combination with a sectional valve casing adapted to be clamped to a main, a valve unit insertable in said casing, the lower section of said casing having a tapered inner wall portion arranged to co-act with complementary means on the valve unit for seating the valve unit in the casing.

3. In combination with a casing adapted to be clamped to a main, a valve unit insertable in said casing, means in the lower portion of the casing co-acting with complementary means on the valve unit for seating the valve unit in position, said casing having opposed vertically disposed grooves in the inner wall thereof arranged to co-act with complementary projections on said valve unit for guiding the latter into position, and a packing in each of said grooves engaging said unit.

4. In combination with a sectional valve casing adapted to be clamped to a main, a valve unit insertable in said casing, said casing having diametrical opposed grooves in the inner wall thereof arranged to co-act with complementary projections on said valve unit for guiding the latter into position, a packing in each of said grooves engaging said valve unit, said valve unit having an axial bore registering with the opening in the main and an angularly disposed opening communicating with the bore, the inner opposed walls of the bore having valve seats connected thereto, valve means movable in said opening and arranged to co-act with said seats for controlling the flow of supply through the main, means for actuating said valve means, and means formed in the lower section of the casing co-acting with complementary means on the valve unit for seating the valve unit in the casing.

5. In combination with a valve casing adapted to be clamped to a main, a valve unit insertable in said casing, said casing having diametrical opposed grooves in the inner wall thereof arranged to co-act with complementary projections on said valve unit for guiding the latter into position, a packing in each of said grooves engaging said unit, adjustable means extending outside of said casing for maintaining the packing in tight engagement with the valve unit, means for guiding the valve unit into the casing, said valve unit having an axial bore registering with the opening in the main and an angularly disposed opening communicating with the bore, the inner opposed walls of the bore having valve seats, valve means movable in said opening and arranged to co-act with said seats for controlling the flow of supply through the main, means for actuating said valve means, the lower section of said casing having a tapered seat arranged to receive a complementary tapered portion of the valve unit for seating the valve unit in the casing.

In testimony whereof I have hereunto set my hand.

ALFRED BRANDRIFF.